Nov. 5, 1935.    M. CANTALUPPI    2,020,238
LEVEL
Filed Oct. 9, 1934
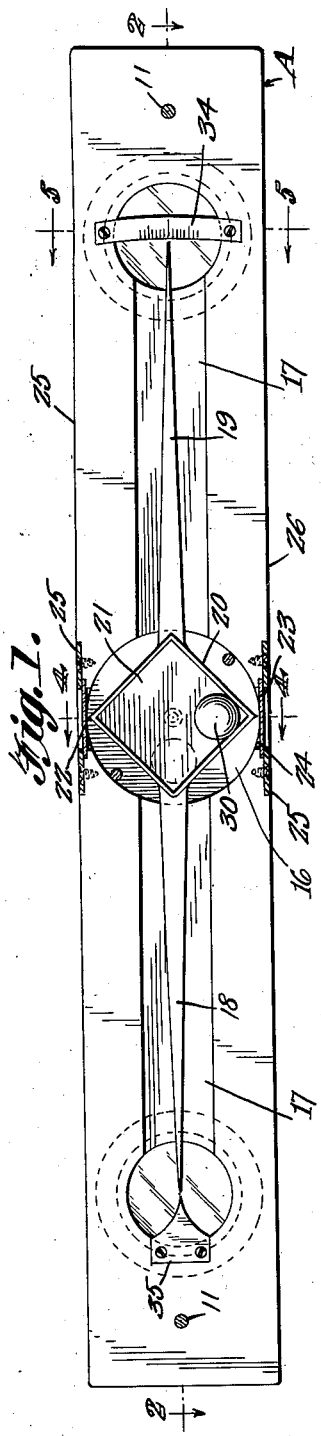
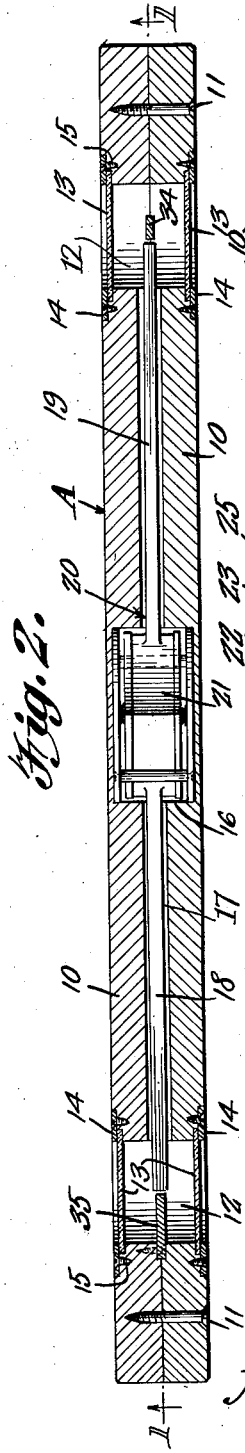
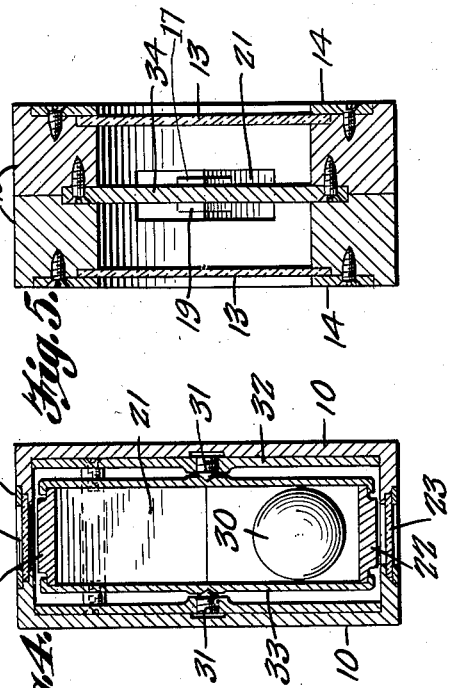
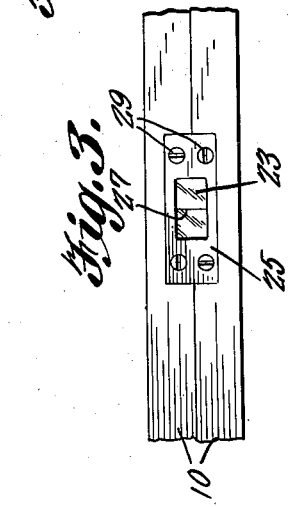
Martino Cantaluppi, INVENTOR Patented Nov. 5, 1935

2,020,238

UNITED STATES PATENT OFFICE 2,020,238

LEVEL

Martino Cantaluppi, Little Falls, N. J.

Application October 9, 1934, Serial No. 747,641

1 Claim. (Cl. 33—215)

The invention relates to a level and has for its primary object to provide an instrument of this kind, wherein the beam is arranged in halves, these being fitted together and so constructed as to confine therein a balancing lever carrying a ball or liquid and functioning to indicate a plumb or level of a piece of work in the use of the instrument.

Another object of the invention is to provide an instrument of this character which is sensitive in kind and accurate in the working thereof and also novel in its make-up.

A further object of the invention is the provision of an instrument of this kind which is simple in its construction, thoroughly reliable and efficient in its purpose, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a sectional view on the line 1—1 of Figure 2 looking in the direction of the arrows.

Figure 2 is a sectional view on the line 2—2 of Figure 1 looking in the direction of the arrows.

Figure 3 is a fragmentary plan view.

Figure 4 is a sectional view on the line 4—4 of Figure 1, looking in the direction of the arrows.

Figure 5 is a sectional view on the line 5—5 of Figure 1 looking in the direction of the arrows.

Similar reference characters indicate corresponding parts throughout the several views in the drawing.

Referring to the drawing in detail, the instrument comprises a beam A including the half sections, these matching each other and arranged side by side and fastened in their matched relation by fasteners 11.

The halves 10 of the beam A, near opposite ends, are provided with the circular aligned transversely disposed openings 12, opposite outer ends of the same being closed by circular glass panels 13, these being counterseated in the halves 10 of the beam A and held by retaining rings 14 which are countersunk in the outer faces of the beam A and concentrically disposed with respect to said openings 12, the rings being preferably secured in place by fasteners 15.

Formed at the center of the beam A and opening only through the inner faces of the halves 10 is a circular chamber 16, while provided at the longitudinal median of the beam A and cut from the inner faces of the halves 10 thereof are clearance ways 17, these opening into the chamber 16 and the openings 12 for the working of oppositely extended pointers 18 and 19, respectively, of a balancing lever 20 having the squared hollow center 21, with the corners 22 opposite each other constituting pointers coacting with leveling sight panels 23, these covering slots 24 opening through the longitudinal top and bottom edges 25 and 26, respectively, and into the chamber 16, each panel 23 being provided with a transversely arranged centering hair line 27 for coaction with the pointer 22 adjacent thereto to enable the user of the instrument to determine the level of a piece of work. Each panel 23 is held in place by a retaining plate 28 fastened, at 29, to the beam A.

Adapted to be confined for free movement within the hollow center 21 of the lever 20 is a balancing ball 30, it being understood that in lieu of the latter a determined quantity of liquid may be substituted. The lever 20 is supported upon centering pivots 31, these being fitted in disks 32 made fast within the chamber 16 and against the closed side walls thereof.

The lever 20, at the hollow center 21, is provided with releasable closure plates 33 so that the ball 30, or its equivalent, can be placed within said lever and these plates have central bearing depressions for the pivots 31.

Spanning the openings 12 at one end thereof and centered with respect thereto are graduated scale pieces 34 with which cooperates the pointer 19, while in the other openings 12 adjacent to the other end of the beam A is a center marker 35, with which cooperates the pointer 18 of the lever 20. It will be seen that the instrument can be used to determine the level of a piece of work or the slant thereof or for determining the plumb of a piece of work, the scale pieces 34 cooperating with the pointer 19 being for this purpose and also from these pieces 34 it can be ascertained the extent that a piece of work is out of plumb, the ball 30 or the equivalent in the hollow center 21 balancing the lever 20 in the functioning of the instrument. The level of a piece of work is determined by the coaction of the pointers 22 with the panels 23. The reading of the instrument can be had from either side of the beam or from the top or bottom edges thereof, that is to say, the plumb reading is had from the opposite sides and the level reading from the top and bottom edges of such beam.

What is claimed is:

An instrument of the character described, comprising a beam made up of two similar substantially rectangular sections which are removably connected and which have their confronting faces centrally formed with an annular chamber, openings adjacent to their ends which are arranged transversely with respect to the chamber and having clearways communicating with said chamber and openings, transparent plates for the chamber and for the openings, a center marker housed between the sections at one of the openings, a scale piece housed between the sections at the second opening, a lever having a central square portion, open at both of its sides, arranged in the chamber, closure plates for the open sides of said central portion of the lever, plates secured to the side walls of the chamber, adjustable pivots carried by said plates received in the central portions of the closure plates, a removable slidable balancing element in said hollow central portion of the lever, and pointers extending in opposite directions from two of the opposed corners of the said hollow center of the lever freely passing through the clearways and having their ends disposed, respectively, adjacent to the marker and the scale.

MARTINO CANTALUPPI.